US008506145B2

(12) United States Patent
Chao

(10) Patent No.: US 8,506,145 B2
(45) Date of Patent: Aug. 13, 2013

(54) METHOD OF USING LENS IMAGING TO CONTROL ANGLE SUBTENDED BY MULTIPLE HOTSPOTS OF A VEHICLE LIGHT

(75) Inventor: Ren-Cheng Chao, Zhongli (TW)

(73) Assignee: Phoenix Optronics Corp., Taoyuan County (TW)

( * ) Notice: Subject to any disclaimer, the term of this patent is extended or adjusted under 35 U.S.C. 154(b) by 23 days.

(21) Appl. No.: 13/344,001

(22) Filed: Jan. 5, 2012

(65) Prior Publication Data

US 2013/0003402 A1 Jan. 3, 2013

(30) Foreign Application Priority Data

Jun. 30, 2011 (TW) ............................. 100123038 A

(51) Int. Cl.
*B60Q 1/00* (2006.01)
*B60Q 3/00* (2006.01)
*F21V 5/00* (2006.01)

(52) U.S. Cl.
USPC ............ 362/520; 362/508; 362/459; 362/460

(58) Field of Classification Search
None
See application file for complete search history.

(56) References Cited

U.S. PATENT DOCUMENTS

| | | | | |
|---|---|---|---|---|
| 3,818,210 | A * | 6/1974 | Pitkjaan | 362/518 |
| 7,254,653 | B2 * | 8/2007 | Tsai et al. | 710/38 |
| 8,108,147 | B1 * | 1/2012 | Blackburn | 701/301 |
| 8,319,441 | B2 * | 11/2012 | Chao | 315/156 |
| 2011/0309756 | A1 * | 12/2011 | Chao | 315/158 |
| 2012/0294024 | A1 * | 11/2012 | Peck et al. | 362/516 |

* cited by examiner

*Primary Examiner* — Natalie Walford
(74) *Attorney, Agent, or Firm* — Rabin & Berdo, P.C.

(57) ABSTRACT

A method using lens imaging to control hotspots of a vehicle light has steps of providing the area light source having a first shape and a first size, mounting the lens in front of the area light source, choosing a focal length between the area light source and the lens, and determining an angle of view $\alpha$ using the first size of the area light source and the focal length of the lens and generating a hotspot of the vehicle light having the first size and a size range. By changing the height of the area light source and the focal length of the lens, an angle of view formed by light emitted from the area light source and passing through the lens is adjustable. Accordingly, a range of hotspots of the vehicle light is controllable.

18 Claims, 5 Drawing Sheets

METHOD OF USING LENS IMAGING TO CONTROL ANGLE SUBTENDED BY MULTIPLE HOTSPOTS OF A VEHICLE LIGHT

BACKGROUND OF THE INVENTION

1. Field of the Invention

The present invention relates to a method for controlling hotspots of a vehicle light and more particularly to a method using lens imaging to control hotspots of a vehicle light.

2. Description of the Related Art

Federal Motor Vehicle Safety Standard 108 (FMVSS 108) regulates all automotive lighting, signaling and reflective devices in the United States. FIGS. 15-1 and 15-2 in FMVSS 108 respectively regulate the photometric requirements when upper beam and low beam headlamps are activated. Being a motor vehicle safety standard, FMVSS 108 also specifically regulates beam patterns of projector vehicle lights to ensure safety of drivers and pedestrians. According to the photometric requirements of various upper beam headlamps and low beam headlamps having different angles of view, projected beams of light of a vehicle light have a specific hotspot range and photometric value requirements. To satisfy the foregoing requirements, parts manufactured by many different techniques are applied to vehicle lights in this regard, for example, a structurally complicated vehicle light cover. Such vehicle light cover has a complicated optical structure to process light beams passing therethrough in different ways, such as focusing, refraction and the like, to project the light beams as desired. However, such vehicle light cover involves manufacturing technique of precision optical elements resulting in high production cost and relatively low yield.

SUMMARY OF THE INVENTION

An objective of the present invention is to provide a method using lens imaging to control an angular range subtended by multiple hotspots of a vehicle light, which employs an area light source having a particular form and lens imaging principles to easily generate a lighting pattern of the vehicle light in conformance with a motor vehicle safety standard.

To achieve the foregoing objective, the method has steps of:

providing the area light source having a first shape and a first size;

positioning the lens in front of the area light source;

choosing a focal length between the area light source and the lens; and determining an angle of view α using the first size of the area light source and the focal length of the lens and generating a lighting pattern of the vehicle light defined by the hotspots and having the same shape as the first shape.

According to the method, the shape of the lighting pattern of the vehicle light depends on the shape of the area light source, an angle of view formed by light emitted from the area light source and passing through the lens is adjustable. Accordingly, a range of hotspots of the vehicle light is controllable to meet the requirements of a motor vehicle safety standard.

Other objectives, advantages and novel features of the invention will become more apparent from the following detailed description when taken in conjunction with the accompanying drawings.

DETAILED DESCRIPTION OF THE INVENTION

Figure 1A:
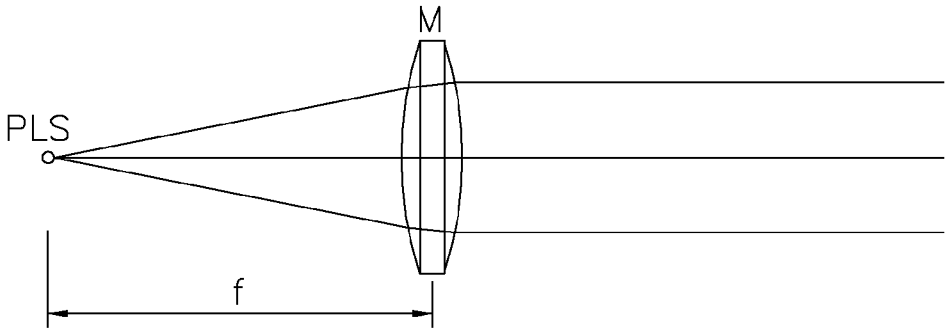
FIGS. 1A to 1C are schematic views for illustrating general lens imaging principles.
Figure 1B:
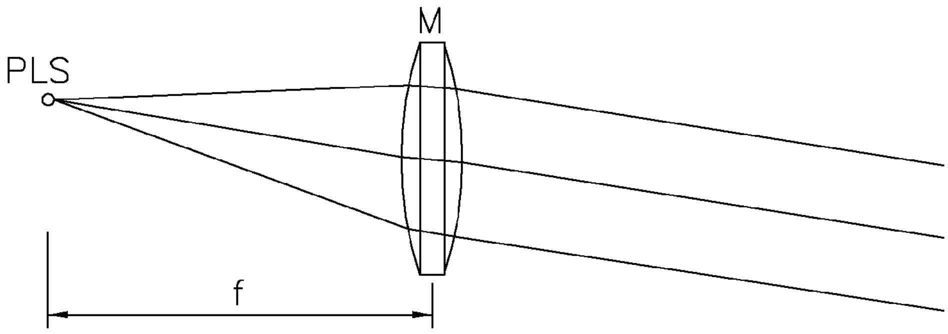
Figure 1C:
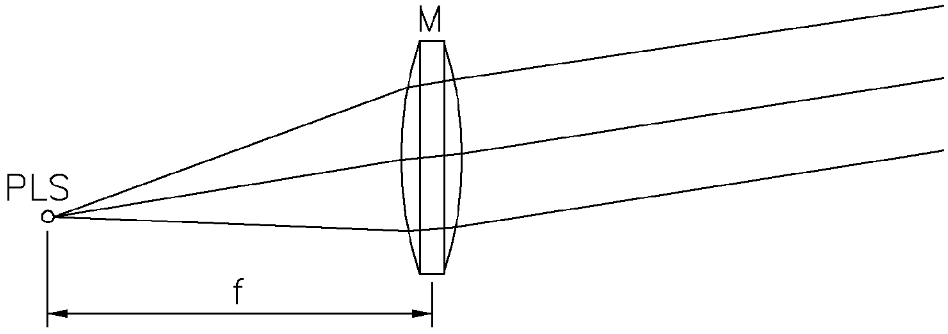

With reference to FIG. 1A, according to a general lens imaging principle, when a point light source PLS is positioned at a focal point of a lens M, multiple beams of light emitted from the point light source PLS pass through the lens M and are collimated in parallel to a lens optical axis. With reference to FIG. 1B, when the point light source PLS is positioned on the focal plane above the optical axis of the lens M, the beams of incident light passing through the lens M incline downwardly from the lens optical axis. With reference to FIG. 1C, when the point light source PLS is positioned on the focal plane below the optical axis of the lens M, the beams of incident light passing through the lens M incline upwardly from the lens optical axis.

Figure 2:
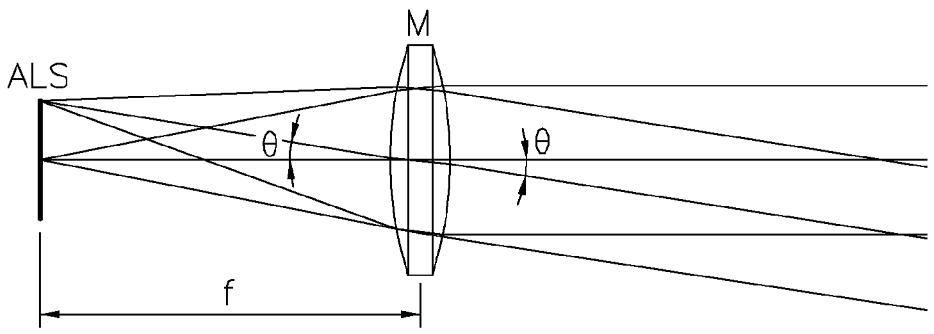
FIG. 2 is a schematic view illustrating a half angle of view defined by an area light source and a lens.
Figure 3:
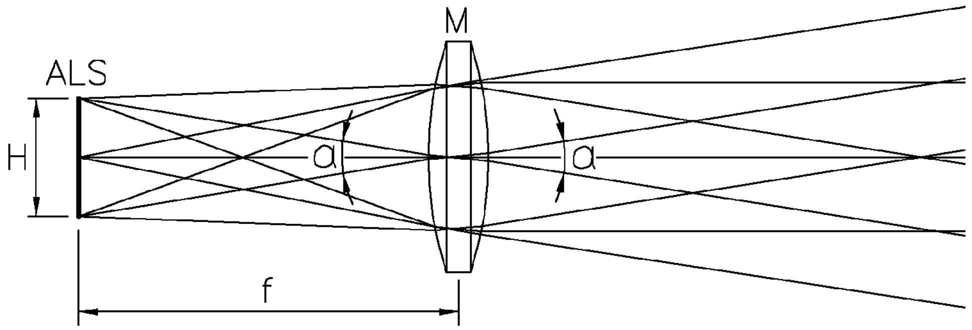
FIG. 3 is a schematic view illustrating an angle of view defined by an area light source and a lens.

As described, the lens imaging principle can be employed to alter the angles of view of beams of light emitted from a light source. As beams of light emitted from an area light source taking a planar form are distributed over an entire surface of the area light source, the beams of light can be incident everywhere on a focal plane of a lens M to define various angles of view. With reference to FIG. 2, a half angle of view θ is defined between a beam of light connecting a point of an area light source ALS and an optical center of a lens M having a focal length (f), and a lens optical axis of the lens M. As there are multiple points on the area light source ALS, multiple half angles of view θ can be defined. With reference to FIG. 3, an angle of view α is defined to double the half angle of view θ. Likewise, as there are multiple points on the area light source ALS, multiple angles of view α can be defined.

Based on the foregoing principles, beams of light generated by a vehicle light can be projected on a hotspot specified in FMVSS 108, and an angular range of hotspot is controllable.

Figure 4:
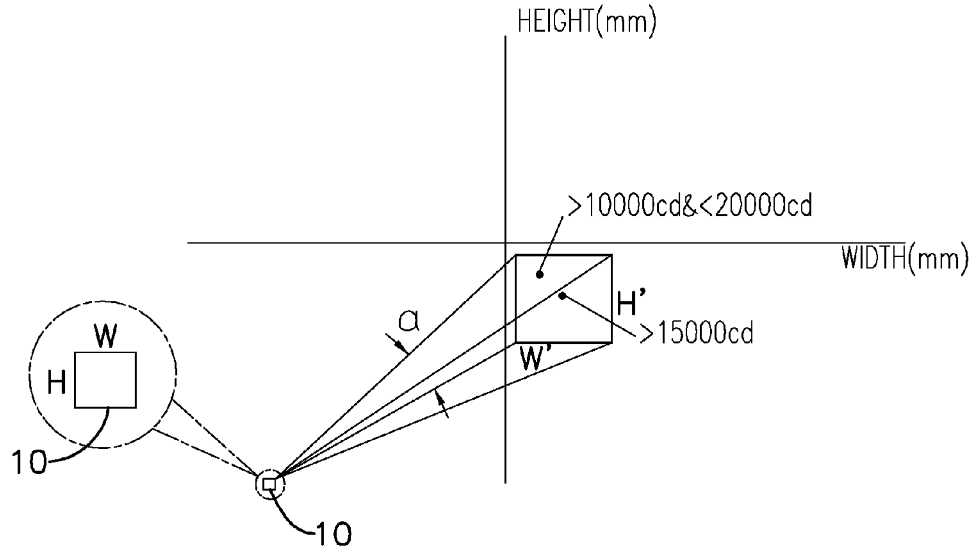
FIG. 4 is a schematic view illustrating a lighting pattern of a vehicle light determined by an angle of view of an area light source in accordance with the present invention.
Figure 5:
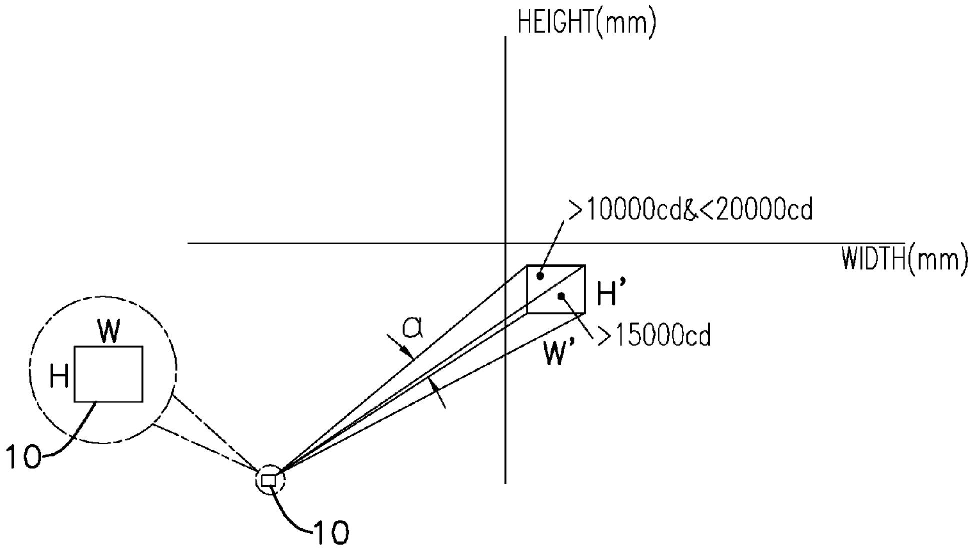
FIG. 5 is another schematic view illustrating a lighting pattern of a vehicle light determined by an angle of view of an area light source in accordance with the present invention.

With reference to FIG. 4, a rectangle is located to the right of a central portion, has a height H' and a width W', and represents a lighting pattern (a range of hotspot containing two hot spots represented by >10000 cd (candela) & <20000 cd and >15000 cd) of a vehicle light. The lighting pattern of the vehicle light is formed by beams of light generated from an area light source 10, passing through a lens and processed by the lens. The area light source 10 is enlarged and shown on a left side, and has a height H and a width W. The shape of the lighting pattern of the vehicle light is identical to that of the area light source 10 except that the height H and the width W of the area light source are not the same as the respective height H' and the width W'. The height H' and the width W' of the lighting pattern of the vehicle light are achieved by varying the angles of view $\alpha$ associated with beams of light projected by the area light source and passing through the lens. In other words, changing the angles of view $\alpha$ can adjust a range of the lighting pattern of the vehicle light as shown in FIG. 5. On the other hand, the height H' and the width W' of the lighting pattern of the vehicle light vary with the height H and width W of the area light source. The beams of light generated from a vehicle light can be projected on a hotspot complying with a motor vehicle safety standard.

Figure 6:
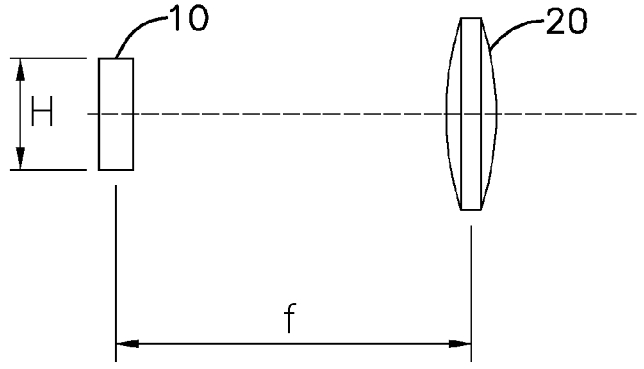
FIG. 6 is a schematic view of an optical module of a vehicle light in accordance with the present invention.

With reference to FIG. 6, an optical module of a vehicle light in accordance with the present invention has an area light source 10 is shown. In the present embodiment, the area light source 10 is composed of a light-emitting diode (LED) chip, is rectangular and has a height H and a width W. The height and the width are equal (a ratio of the height to the width being 1:1). The shape of the area light source 10 determines the shape of a lighting pattern generated by the optical module of the vehicle light.

The optical module further has a lens 20 mounted in front of the area light source 10 and spaced a focal length (f) apart from the area light source 10. According to the following lens imaging formula, the focal length (f) determines an angle of view $\alpha$ of the area light source 10 with respect to the lens 20.

$$\alpha = 2\tan^{-1}\frac{H}{2f}$$

Figure 7:
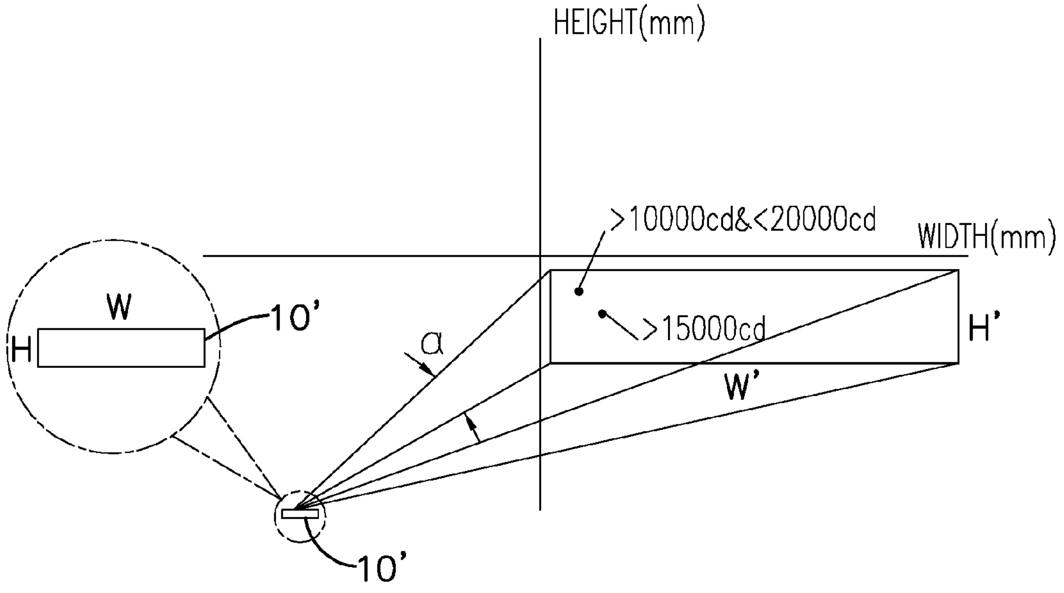
FIG. 7 is a schematic view of a lighting pattern of a vehicle light determined by a size of an area light source in accordance with the present invention.

Suppose that the height of the area light source H=1 mm and the focal length (f) is in a range of 22~45 mm. A range of the angle of view $\alpha$ is obtained by substituting the corresponding values of the height H and the focal length (f) into the above formula. The range of the angle of view $\alpha$ determines a boundary and a size of the lighting pattern of the vehicle light. The foregoing embodiments describe the relationship between the shape of the area light source 10 and that of the lighting pattern of the vehicle light, and also depict how the height H of the area light source 10 affects the angle of view $\alpha$ and the size of the lighting pattern of the vehicle light. Furthermore, the size of the lighting pattern of the vehicle light varies with the ratio of the height H to the width W of the area light source 10. With reference to FIG. 7, the ratio of the height H to the width W of the area light source 10' is 1:4 and the ratio of the height H" to the width W" of the lighting pattern of a vehicle light is also 1:4, that is, adjustment of the ratio of the height H to the width W of the area light source 10' results in the change of the ratio of the height H" to the width W" of the lighting pattern of the vehicle light. The ratio of the height H to the width W of the area light source 10' includes but not limited to the above-mentioned 1:4 and is adjustable based on an actual demand. A feasible range of the ratio of the height H to the width W is in a range of 1:1 to 1:6.

Figure 8:
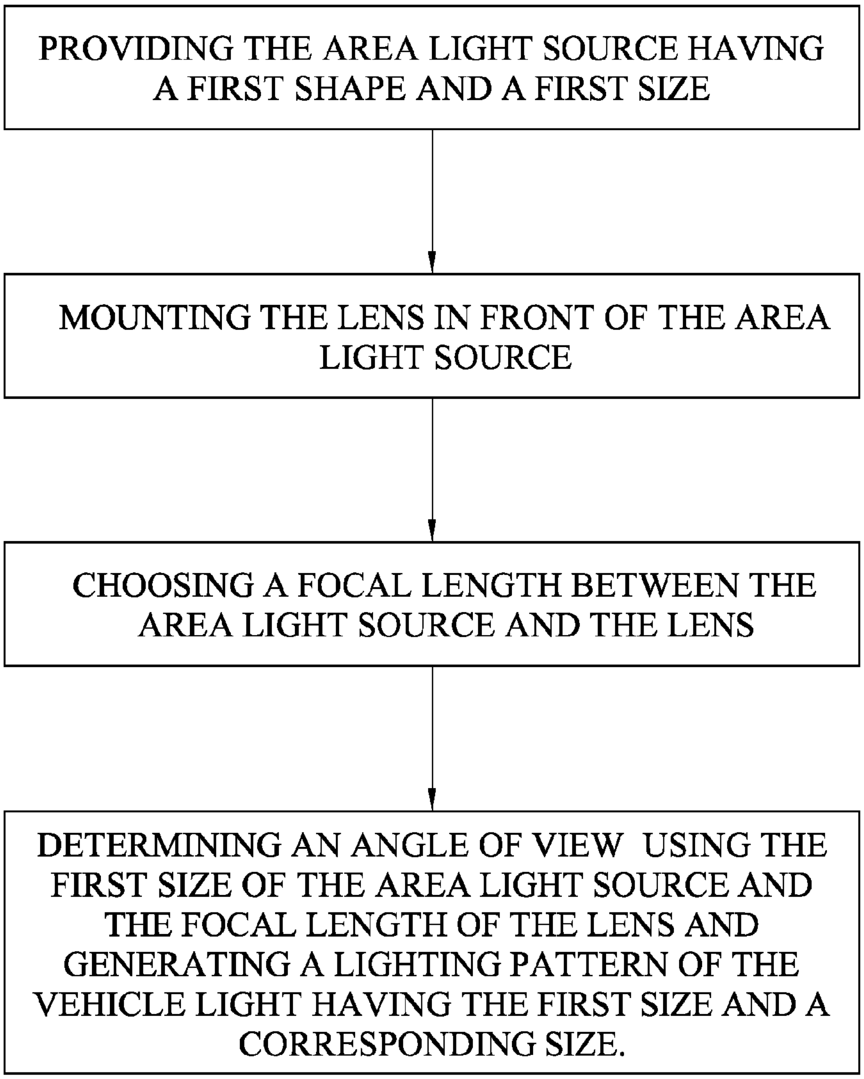
FIG. 8 is a flow diagram of a method using lens imaging to control hotspots of a vehicle light in accordance with the present invention.

With reference to FIG. 8, a method using lens imaging to control an angular range subtended by the hotspots of a vehicle light in accordance with the present invention is executed by using the foregoing optical module and has steps of:

providing the area light source having a first shape and a first size;

mounting the lens in front of the area light source;

choosing a focal length between the area light source and the lens; and determining an angle of view $\alpha$ using the first size of the area light source and the focal length of the lens and generating a lighting pattern of the vehicle light having the first size and a corresponding size.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A method using lens imaging to control an angular range subtended by multiple hotspots of a vehicle light, comprising steps of:

providing the area light source having a first shape and a first size;

positioning the lens in front of the area light source;

choosing a focal length between the area light source and the lens; and determining an angle of view $\alpha$ using the first size of the area light source and the focal length of the lens and generating a lighting pattern of the vehicle light defined by the hotspots and having the same shape as the first shape.

2. The method as claimed in claim 1, wherein the area light source is rectangular, and the lighting pattern of the vehicle light formed by light generated from the area light source and passing through the lens is rectangular.

3. The method as claimed in claim 2, wherein the area light source has a height and a width, and a ratio of the height to the width is in a range of 1:1 to 1:6.

4. The method as claimed in claim 1, wherein the angle of view is determined by the following equation:

$$\alpha = 2\tan^{-1}\frac{H}{2f}$$

where H is the height of the area light source; and
f is the focal length of the lens.

5. The method as claimed in claim 2, wherein the angle of view is determined by the following equation:

$$\alpha = 2\tan^{-1}\frac{H}{2f}$$

where H is the height of the area light source; and
f is the focal length of the lens.

6. The method as claimed in claim 3, wherein the angle of view is determined by the following equation:

$$\alpha = 2\tan^{-1}\frac{H}{2f}$$

where H is the height of the area light source; and
f is the focal length of the lens.

7. The method as claimed in claim 4, wherein the height H of the area light source is 1 mm, and the focal length of the lens is in a range of 22 mm to 45 mm.

8. The method as claimed in claim 5, wherein the height H of the area light source is 1 mm, and the focal length of the lens is in a range of 22 mm to 45 mm.

9. The method as claimed in claim 6, wherein the height H of the area light source is 1 mm, and the focal length of the lens is in a range of 22 mm to 45 mm.

10. The method as claimed in claim 1, wherein the area light source is composed of a light-emitting diode (LED) chip, and the height and the width of the area light source are respectively the height and the width of the LED chip.

11. The method as claimed in claim 2, wherein the area light source is composed of a light-emitting diode (LED) chip, and the height and the width of the area light source are respectively the height and the width of the LED chip.

12. The method as claimed in claim 3, wherein the area light source is composed of a light-emitting diode (LED) chip, and the height and the width of the area light source are respectively the height and the width of the LED chip.

13. The method as claimed in claim 4, wherein the area light source is composed of a light-emitting diode (LED) chip, and the height and the width of the area light source are respectively the height and the width of the LED chip.

14. The method as claimed in claim 5, wherein the area light source is composed of a light-emitting diode (LED) chip, and the height and the width of the area light source are respectively the height and the width of the LED chip.

15. The method as claimed in claim 6, wherein the area light source is composed of a light-emitting diode (LED) chip, and the height and the width of the area light source are respectively the height and the width of the LED chip.

16. The method as claimed in claim 7, wherein the area light source is composed of a light-emitting diode (LED) chip, and the height and the width of the area light source are respectively the height and the width of the LED chip.

17. The method as claimed in claim 8, wherein the area light source is composed of a light-emitting diode (LED) chip, and the height and the width of the area light source are respectively the height and the width of the LED chip.

18. The method as claimed in claim 9, wherein the area light source is composed of a light-emitting diode (LED) chip, and the height and the width of the area light source are respectively the height and the width of the LED chip.

* * * * *